Sept. 8, 1931.  J. W. WHITE  1,821,954

WHEEL

Filed June 3, 1925

Inventor
JOHN WILLIAM WHITE
BY
*Clarence Spalker*
His Attorney

Patented Sept. 8, 1931

1,821,954

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed June 3, 1925. Serial No. 34,645.

This invention relates to an improvement in wheels, and more particularly in wheels of the disc type, in which the disc and rim are welded into a single piece, and to the method of making such wheels.

The primary object of this invention is to provide a disc wheel with a minimum number of parts, in which wheel the disc is united to the rim electrically by butt-welding.

Another object of this invention is the provision of a method for electrically butt-welding the outer edge of a wheel disc to the base of the wheel rim.

A further object of this invention is the provision of means for welding said wheels in which means advantage is taken of all phases of alternating current.

Other objects of this invention will appear from a consideration of the following description taken in connection with the drawings which form a part thereof, and in which Fig. 1 is a sectional view illustrating the preliminary step in the formation of a wheel according to one method, which may be employed;

Figure 1:
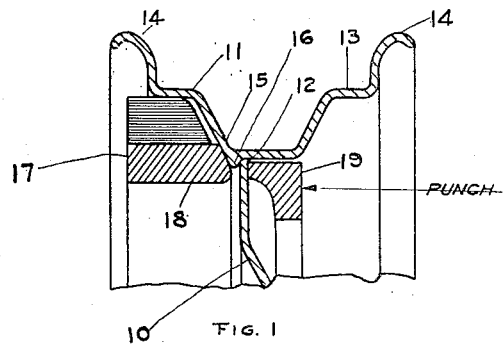

The practice of uniting a wheel disc to a rim by riveting or welding a peripheral flange on the wheel disc to the base of the rim is not new, but this requires the provision of such a flange, and thus increases the weight of the finished wheel by that amount. The present endeavor is to make the wheel as light as possible, and to eliminate the necessity of providing this peripheral flange by uniting the wheel disc directly to the rim by butt-welding.

Referring to the drawings, the reference numeral 10 is employed to designate a wheel disc, to which is to be secured a rim 11. The disc 10 is not provided with a peripheral flange on which the rim rests, as was formerly done, but terminates abruptly at its outer edge in the surface 12. The rim illustrated is of the drop center type having a tire receiving base 13, flanges 14 and a drop center portion 15, which portion rests upon the surface 12 of the wheel disc.

Figure 2:
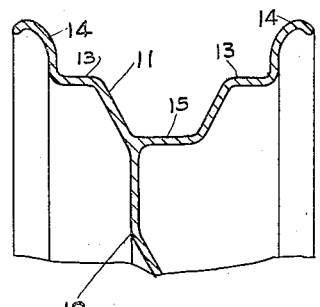
Fig. 2 is a sectional view showing the wheel of Fig. 1 completed.

The method illustrated in Figures 1 and 2 calls for the uniting of the wheel disc to the rim by a simultaneous punching and heating operation. This method is particularly adapted for use in connection with a rim of the type shown in Figures 1 and 2, in which is provided at the outer edge of the base of the portion 15 an annular projection 16, against the rear face of which the surface 12 of the disc 10 rests when the parts are first assembled, as shown in Figure 1.

The outer portion of the rim 11 is supported by a die 17, having a copper anvil 18. A clamping member 19, also of copper, is provided which rests against the inner face of the disc adjacent its periphery. The die 17 is stationary during this operation and the clamp 19 is forced to approach the die 17 by any suitable means. The operation would preferably be carried on in a power press, but since this involves no part of the invention, it has not been illustrated.

The anvil 18 of the die 17 and the clamp 19 are connected to the positive and negative leads of a transformer in accordance with the usual welding method, so that when they bear against the disc 10, the current will jump from one member to the other through the metal, thus heating the periphery of the disc and the rim projection 16 between the die and the punch. At the same time the clamp 19 is advanced to carry the periphery of the disc 10 toward the die 17, and under the influence of this pressure and the heat created by the passage of the current between the die and the punch, the surface 12 of the disc is rigidly welded to the projection 16 of the rim, as shown in Fig. 2.

Figure 3:
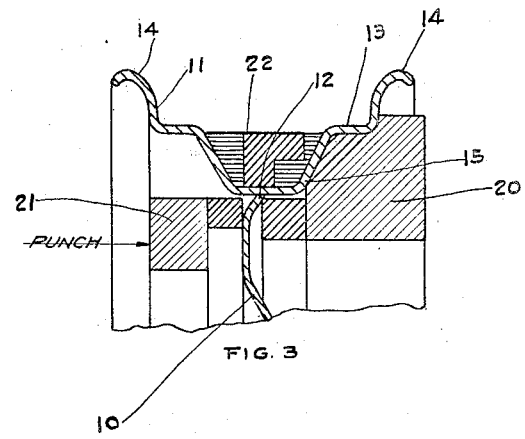
Fig. 3 is a similar view of another method that might be employed, illustrating the completion of the operation.
Figure 4:
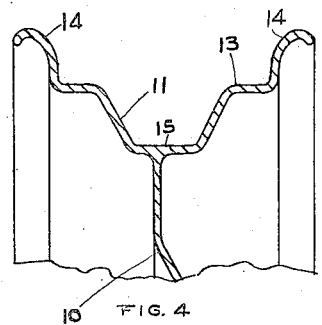
Fig. 4 is a sectional view of the wheel of Fig. 3 completed.

In the method illustrated in Figures 3 and 4 the peripheral portions of the disk are bent laterally outwardly of the plane of the disk to provide an excess amount of metal and the outer edge of the disk is engaged with the base of the rim at the proper point. The peripheral portions aforesaid of the disk are then straightened and subjected to heat to form the construction shown in Figure 4. In carrying out this method there is provided a guide 20, which supports the inner portion of the rim 11 and determines the contact of the surface 12 of the disc with the base of the rim, a rim of the usual drop center type without the projection 16 being illustrated. Bearing against the outer face of the disc 10, adjacent its periphery is a clamp 21, while within the portion 15 of the rim is located a die 22 adapted to be moved into engagement with the rim for preventing deformation of the latter during the welding process.

The guide 20 is provided with a copper anvil 23, the clamp 21 with a copper nose 24, and the die 22 with a copper center 25. The anvil and nose are connected to one pole of the transformer and the center is connected to the other pole.

When the parts have been located as described, current is sent through the anvil 23 of the guide 20, the nose 24 of the clamp 21 and the center 25 of the die 22, the clamp 21 being at the same time advanced to carry the periphery of the disc against the guide 20, and straighten it out. The radial pressure exerted upon the rim, caused by straightening out the peripheral portions 12 of the disk, is prevented from deforming the rim by the die 22 which, as will be observed from Figure 3, functions as an abutment or support for the rim.

The usual heating operation is set up by reason of the electric current in the guide 20, the clamp 21 and the die 22, and as a consequence of the heat and pressure the surface 12 of the disc is rigidly butt-welded to the base of the rim 11. Thus, it will be seen that the die 22 in addition to forming an abutment for the rim, as specified above, also forms an electrode for the welding operation.

Figure 5:
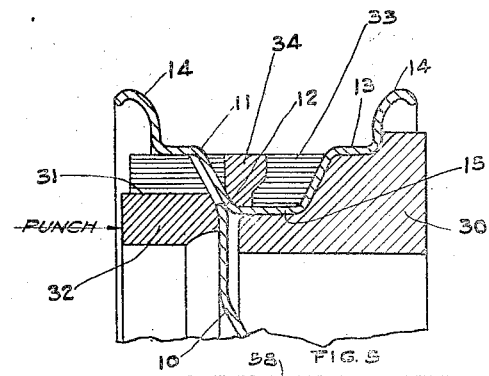
Fig. 5 is a sectional view of a wheel about to be assembled in accordance with a third method.
Figure 6:
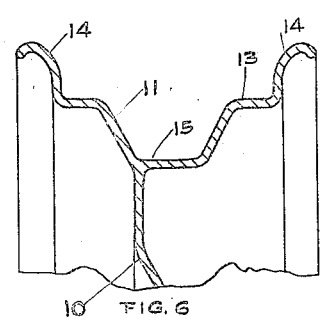
Fig. 6 is a sectional view of the wheel of Fig. 5, with the parts in the finished position.

The method shown in Figures 5 and 6 differs from that shown in Figures 3 and 4 in that the rim 11 is not contracted onto the disc, but the latter is so shaped that under the action of the punch it will be forced against the under side of the rim base. Referring to these figures the numeral 30 is employed to designate a guide for supporting the inner portion of the rim 11. A clamp 31 having a copper nose 32 is arranged in position to engage the outer face of the periphery of the disc.

Mounted in the base of the rim 11 is a die 33 having a copper center 34. The clamp 31 and die 33 are connected to the positive and negative leads of the transformer. The disc 10 is made of such dimensions that under the action of the clamp 31, the outer periphery is forced to expand against the inner surface of the rim 11. With the parts in the position shown diagrammatically in Figure 5, the clamp 31 is advanced, and at the same time current is fed through the nose 32 and the center 34 of the die 33. The presence of this current heats the periphery of the disc and also the base of the rim, while at the same time under the clamping operation the outer edge of the disc is straightened and forced against the base of the rim. The die 33 prevents deformation of the base 15 during the time the surface 12 of the disc is securely welded to the under face of the base, as shown in Figure 6. The dies 22 and 33, hereinbefore referred to, may be moved into engagement with the base of the rim in any desirable manner and by any suitable mechanism.

The result of each of the three methods above described is the formation of a butt weld, by which the disc and rim are rigidly united with the rim resting upon the outer edge of the disc and not upon any peripheral flange thereof. In each method surplus metal is provided so that the contacting parts when softened, will be forced against each other, and held under tension in that position until they have become welded together.

While three different methods of obtaining this result have been described, it will be understood that applicant is not limited thereto since other methods might be employed which would attain the same result, and would fall within the spirit and scope of the claims hereafter set forth.

Figure 7:
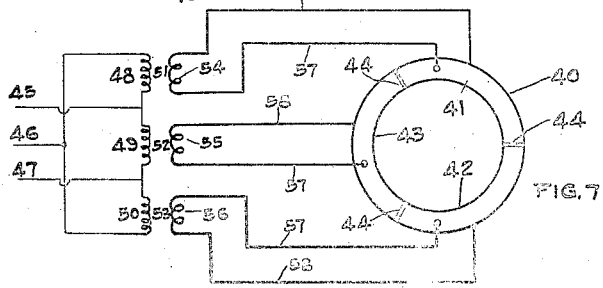
Fig. 7 is a diagram illustrating the electrical connections.

Heretofore it has been customary to use in electric welding single phase current only, and since electrical power is now universally transmitted in the polyphase form, the use of electric welders is objectionable because the electric circuit is unbalanced. In order to prevent this and to use each phase, the current, the welding punches, guides and dies described above may be made, as is set forth in Figure 7, which shows diagrammatically the manner in which the positive and negative leads from the transformers are secured to the welding units, when all phases of a polyphase current are used.

A ring 40, which represents one of the clamps 17, 21 or 31 is divided into three equal segments 41, 42 and 43, separated from each other by insulation 44. A corresponding guide or die ring would also be used as described above, but for the purpose of clarity these parts are now shown.

The numerals 45, 46 and 47 are used to designate the leads of a triphase electric circuit, which supply current to the primaries 48, 49 and 50 of three transformers 51, 52 and 53. The secondary 54 of transformer 51 is connected by lead 57 to the segment 41 of the ring 40, while a lead 58 connects the secondary 54 to the corresponding guide or die segment not shown, whereby a circuit through the disc is provided and the portions of the disc between the segment 41 of the ring 40 and the corresponding guide or die segment are softened and welded together. Similarly the secondary 55 of the transformer 52 is connected to the segment 42 and the corresponding guide or die segment and the secondary 56 of the transformer 53 is connected to the segment 43 and the corresponding guide or die segment.

While this feature has been shown and described in connection with a triphase circuit, applicant is not to be limited thereto, since it is obvious that it could be used in connection with any polyphase circuit.

Having thus set forth my invention, what I claim as new and for which I desire protection by Letters Patent, is:

1. Those steps in the method of fashioning a vehicle wheel having a rim member and a disk wheel body member which include positioning the disk and rim in operative relation with the peripheral portions of the disk adapted to overlap portions of the rim, urging the peripheral portion aforesaid of the disk radially outwardly into engagement with the rim, and butt-welding the said portion to the rim.

2. Those steps in the method of fashioning a wheel having a circular rim member and a disk wheel body member which include positioning the disk and rim member in operative relation, urging the outer edge of the disk member outwardly into engagement with the base of the rim, welding the peripheral portions of the disk to the base of the rim, and holding the rim circular during the welding operation.

3. Those steps in the method of fashioning a vehicle wheel having a rim member and a disk wheel body member which include, bending the outer portion of the disk member out of the plane of the disk, positioning the disk and rim member in operative relation, exerting a pressure upon the portion aforesaid of the disk member to straighten the same and thereby overlap the outer edge of the disk member with the base of the rim, and butt-welding the overlapping portions of the disk member and rim together.

4. Those steps in the method of fashioning a vehicle wheel having a rim member and a disk wheel body member which include positioning the disk wheel body member within the boundary of the rim, flexing a portion of the disk wheel body member to urge the peripheral portions thereof into engagement with the rim, and welding the said peripheral portions of the disk to the rim.

5. Those steps in the method of fashioning a vehicle wheel having a rim member which include providing a disk wheel body member of greater diameter than the internal diameter of the rim member, offsetting the peripheral portions of the disk wheel body member sufficient to permit locating the same within the boundaries of the rim member, subsequently exerting a pressure upon the offset portion tending to straighten the same and thereby urge the periphery of the disk into engagement with the base of the rim member, and simultaneously welding the offset peripheral portion of the disk to the rim member.

In testimony whereof I have affixed my signature.

JOHN WILLIAM WHITE.